US010050459B2

(12) United States Patent
Schwartz et al.

(10) Patent No.: US 10,050,459 B2
(45) Date of Patent: *Aug. 14, 2018

(54) CURRENT SENSING CIRCUIT DISCONNECT DEVICE AND METHOD

(71) Applicants: Robert M. Schwartz, Miami, FL (US); Peter M. Hockman, Miami, FL (US); Gregg M. Connary, Boynton Beach, FL (US); Richard A. Berkowitz, Miami, FL (US)

(72) Inventors: Robert M. Schwartz, Miami, FL (US); Peter M. Hockman, Miami, FL (US); Gregg M. Connary, Boynton Beach, FL (US); Richard A. Berkowitz, Miami, FL (US)

( * ) Notice: Subject to any disclaimer, the term of this patent is extended or adjusted under 35 U.S.C. 154(b) by 187 days.

This patent is subject to a terminal disclaimer.

(21) Appl. No.: 14/329,787

(22) Filed: Jul. 11, 2014

(65) Prior Publication Data
US 2014/0320073 A1 Oct. 30, 2014

Related U.S. Application Data

(63) Continuation-in-part of application No. 13/908,217, filed on Jun. 3, 2013, which is a continuation-in-part
(Continued)

(51) Int. Cl.
*H02J 7/00* (2006.01)
*H02J 9/00* (2006.01)

(52) U.S. Cl.
CPC .......... *H02J 7/0052* (2013.01); *H02J 7/0042* (2013.01); *H02J 9/005* (2013.01);
(Continued)

(58) Field of Classification Search
CPC ..................................................... H02J 7/0052
(Continued)

(56) References Cited

U.S. PATENT DOCUMENTS

| 2,706,225 A | 4/1955 | Freeman |
| 2,885,623 A | 5/1959 | Staufenberg |

(Continued)

FOREIGN PATENT DOCUMENTS

| EP | 1122872 | 8/2001 |
| EP | 1473813 | 11/2004 |

(Continued)

*Primary Examiner* — Samuel Berhanu
*Assistant Examiner* — Tessema Kebede
(74) *Attorney, Agent, or Firm* — Robert M. Schwartz; Kerry P. Sisselman (57) ABSTRACT

A device and method are provided for saving power and electricity in a charging device including external power supplies and battery chargers having a primary circuit and a secondary circuit where a switch is located in the primary circuit and a current sensing device in the secondary circuit to sense when there is a drop in current in the secondary circuit or no current in the secondary circuit because the load such as a cell phone or tablet is charged and when this occurs the switch in the primary circuit is opened and the primary circuit no longer draws power from the source of power until the switch in the primary circuit is closed by either a user activating a switch to reenergize the charging device, where the switch may be powered by an on-board battery to close the primary circuit, or where a control circuit is activated by a program in the load or device to be charged, such that the charging device will cycle on and off according to an external app program residing on the device to be charged or some other device not attached to the controller.

14 Claims, 8 Drawing Sheets

Related U.S. Application Data of application No. 13/892,509, filed on May 13, 2013, now Pat. No. 9,035,604, which is a continuation of application No. 12/843,151, filed on Jul. 26, 2010, now Pat. No. 8,456,137.

(60) Provisional application No. 61/845,179, filed on Jul. 11, 2013.

(52) U.S. Cl.
CPC .................. *H02J 2007/0059* (2013.01); *H02J 2007/0062* (2013.01); *H02J 2009/007* (2013.01)

(58) Field of Classification Search
USPC ........................................................ 320/107
See application file for complete search history.

(56) References Cited

U.S. PATENT DOCUMENTS

| | | | |
|---|---|---|---|
| 4,482,789 A | 11/1984 | McVey | |
| 4,544,909 A | 10/1985 | Di Nunzio | |
| 5,760,491 A | 6/1998 | Kalin | |
| 6,028,413 A | 2/2000 | Brockmann | |
| 6,204,637 B1 | 3/2001 | Rengan | |
| 6,316,844 B1 | 11/2001 | Arima | |
| 6,339,314 B1 | 1/2002 | Bruning | |
| 6,489,725 B1 | 12/2002 | Suzuki et al. | |
| 6,509,658 B1 | 1/2003 | Kim | |
| 6,586,849 B2 | 7/2003 | Tarr | |
| 6,671,814 B1 | 12/2003 | Kubo | |
| 6,777,828 B1 | 8/2004 | Rothstein | |
| 6,865,094 B2* | 3/2005 | Malik | H02J 9/005 363/21.12 |
| 6,874,093 B2 | 3/2005 | Bell | |
| 6,895,516 B2 | 5/2005 | Odaohhara | |
| 6,986,067 B2 | 1/2006 | Odaohhara | |
| 7,132,763 B2 | 11/2006 | Rendic | |
| 7,184,258 B2 | 2/2007 | Lai | |
| 7,224,086 B2 | 5/2007 | Germagian et al. | |
| D587,192 S | 2/2009 | McGinley et al. | |
| D587,193 S | 2/2009 | McGinley et al. | |
| 7,516,343 B2 | 4/2009 | Bhogal | |
| 7,560,907 B2 | 7/2009 | Nelson | |
| 7,597,570 B2 | 10/2009 | So | |
| 7,635,273 B2 | 12/2009 | Buzil | |
| D611,416 S | 3/2010 | McGinley et al. | |
| 7,779,278 B2* | 8/2010 | DuBose | H02M 3/156 323/271 |
| 7,800,351 B2 | 9/2010 | Gan | |
| 7,910,833 B2 | 3/2011 | McGinley et al. | |
| 7,910,834 B2 | 3/2011 | McGinley et al. | |
| 7,923,869 B2* | 4/2011 | Bågenholm | H02J 7/00 307/125 |
| 7,960,648 B2* | 6/2011 | McGinley | 174/36 |
| 8,242,359 B2 | 8/2012 | McGinley et al. | |
| 8,531,058 B2* | 9/2013 | Federmann | H02J 9/005 307/66 |
| 8,853,884 B2* | 10/2014 | genannt Berghegger | H02J 9/005 307/125 |
| 9,035,604 B2* | 5/2015 | Schwartz | H02J 7/0052 307/104 |
| 2004/0056533 A1 | 3/2004 | Chen | |
| 2005/0041360 A1 | 1/2005 | Dettweiler | |
| 2005/0237036 A1* | 10/2005 | Nguyen | G05F 1/14 323/247 |
| 2006/0202557 A1 | 9/2006 | Menas et al. | |
| 2006/0292905 A1 | 12/2006 | Gilliland | |
| 2007/0047270 A1* | 3/2007 | Makino | H02J 9/005 363/34 |
| 2007/0141894 A1 | 6/2007 | McGinley et al. | |
| 2007/0164704 A1 | 7/2007 | McGinley | |
| 2007/0300089 A1 | 12/2007 | Bhogal | |
| 2008/0059816 A1 | 3/2008 | Paniagua | |
| 2008/0130340 A1 | 6/2008 | Unger et al. | |
| 2008/0222431 A1 | 9/2008 | Paniagua | |
| 2009/0027922 A1 | 1/2009 | Tracy et al. | |
| 2009/0177906 A1 | 7/2009 | Paniagua | |
| 2009/0287947 A1* | 11/2009 | DuBose | G06F 1/28 713/323 |
| 2009/0289596 A1 | 11/2009 | McGinley et al. | |
| 2009/0295233 A1 | 12/2009 | McGinley et al. | |
| 2010/0001685 A1* | 1/2010 | Eastlack | H02J 7/025 320/108 |
| 2010/0041262 A1 | 2/2010 | Chesneau | |
| 2010/0225273 A1 | 9/2010 | Eastlack | |
| 2011/0050170 A1* | 3/2011 | Eastlack | H02J 7/022 320/111 |
| 2011/0260055 A1 | 10/2011 | McGinley et al. | |
| 2012/0062182 A1 | 3/2012 | Rimdzius et al. | |
| 2012/0326502 A1 | 12/2012 | Nguyen et al. | |
| 2013/0026977 A1 | 1/2013 | Pei et al. | |
| 2013/0187596 A1 | 7/2013 | Eastlack | |
| 2013/0187597 A1 | 7/2013 | Eastlack | |

FOREIGN PATENT DOCUMENTS

| | | |
|---|---|---|
| EP | 1513255 | 3/2005 |
| GB | 2438655 | 12/2007 |
| JP | 4-165957 | 6/1992 |
| WO | 88/06814 | 9/1988 |
| WO | 2007/027063 | 3/2007 |
| WO | 2008/062174 | 5/2008 |
| WO | WO2009/001176 | 12/2008 |
| WO | 2011/129995 | 10/2011 |

\* cited by examiner

CURRENT SENSING CIRCUIT DISCONNECT DEVICE AND METHOD

CROSS-REFERENCE TO RELATED APPLICATIONS

This application is a Continuation-in Part-application of co-pending U.S. patent application Ser. No. 13/908,217 filed Jun. 3, 2013, and the Continuation-in Part-application of co-pending U.S. patent application Ser. No. 13/892,509 filed May 13, 2013, entitled Current Sensing Circuit Disconnect Device and Method, which is a Continuation-in-Part of co-pending U.S. patent application Ser. No. 12/843,151 filed Jul. 26, 2010, entitled Current Sensing Circuit Disconnect Device and Method, which claims priority from U.S. Provisional Application No. 61/228,213 filed on Jul. 24, 2009. This application further claims priority to U.S. Provisional Application Ser. No. 61/825,164 filed on May 20, 2013 entitled Current Sensing Circuit Disconnect Adaptor, and U.S. Provisional Application Ser. No. 61/845,179 filed on Jul. 11, 2013 entitled Current Sensing Circuit Disconnect Adaptor the disclosures of each of these applications being incorporated herein, by reference, in their entireties.

FIELD OF THE INVENTION

The invention relates to battery charging devices and external power supplies, hereinafter also jointly referred to as "charging devices", and methods for disconnecting these charging devices from the mains or the electrical power source in order to eliminate or minimize the flow of current into the charging device when these charging devices and power supplies are still plugged in or connected to the mains, but are no longer charging or providing power to a load. In accordance with the present invention, the charging device is effectively disconnected from the mains when there is a reduction or cessation of current flow sensed in the secondary circuit or the load circuit. Additionally, the invention relates to turning on the charging device after it has been disconnected from the mains or other power source, including a manual reconnect button, using a power source which is an internal battery circuit with a battery in the charging device to initially boot up the charging device; and using a power source where power is obtained from the device to be charged, or the load, and the power from that device initially boots up the charging device when it has no power or the primary circuit is open. Further when a load or device such as a cell phone or tablet device is left plugged into or connected to the charging device over an extended period of time, a program within the charging device or an App Program (application program) within the device to be charged, can issue a signal or cause a voltage be applied to reenergize the charging device, causing the disconnected charging device to reconnect, or to close the primary circuit to continue charging the load/device to be charged.

DESCRIPTION OF THE RELATED ART

Recently, significant concerns have been raised regarding the environmental impact of wasted electricity. In particular the use of energy by devices standing in idle mode or standby mode has been criticized as using electricity to no purpose, and thus wasting electricity and the valuable resources used to generate it.

One particular example of wasted energy occurs with battery chargers and external power supplies (hereinafter charging devices) of all kinds, including those associated with such devices as laptop computers, tablet computers, power tools, electric toothbrushes and portable, mobile and/or cellular telephones, as well as other devices that include a battery to be charged. These charging devices exhibit two distinct low power modes that utilize energy even when there is no load connected to the charging device or battery to be charged. These modes are generally referred to as "standby" and "idle". "Standby" mode occurs when a charging device is plugged into an outlet or the mains, but there are no batteries or load connected to the charger (i.e., no load connected to the charging device). For example, this occurs when a cell phone charging device is plugged into the wall or the mains, but the cell phone is not connected to the charger.

"Idle" mode occurs when no charging is taking place because the battery attached or connected to the charging device is fully charged. In this situation, the charging device is connected between the mains and the load or device to be charged, and the load or device, typically a smart device, is charged and, therefore, is no longer charging. As a result the load draws no current from the charging circuit on the secondary side of the charging device, but the charging device is still connected to the mains and there is typically current flow in the primary circuit of the charging device which unnecessarily waists power. It is believed that billions of kW hours are currently wasted by battery charging devices running in the standby and idle modes. At present, people, users of charging devices, are being encouraged to physically unplug these charging devices from the mains when not in use, so as to reduce the amount of electricity wasted.

What is needed is a device that can be used to eliminate or cut-off the electricity usage of devices, and in particular, of charging devices, operating in the standby and idle modes or similar modes of operation.

What is also needed is a way to reconnect a disconnected charging device when the primary circuit has been disconnected, or is open.

Further what is needed is a logic portion to communicate between the charging device and the load. One advantage would be for the load to prompt the charging device to turn back on when the load needs a charge to its batteries.

Finally what is needed is an Application Program resident on the device to be charged that can determine the remaining battery charge of the device and when a threshold is met, e.g. 65% charge remaining, that the Application Program can cause the charging device to boot up and provide additional battery charge from the charging device to the device to be charged, until it is preferably fully charged again.

SUMMARY OF THE INVENTION

It is accordingly an object of the present invention to provide a battery charging device that will disconnect or mechanically break or open the primary circuit connected to the mains when the charging device is determined to be in a standby or idle mode of operation.

It is an object of the present invention to provide a battery charging device to effectively disconnect the charging device from the mains when the charging device is determined to be in a standby or idle mode of operation or is no longer charging the charging device.

It is another object of the invention to reconnect the adapter and the charging device to the mains after it has been disconnected.

In one particular embodiment of the invention, the charging circuit includes a circuit interrupter in the primary circuit and a switch to reconnect the primary circuit to the mains after it is has been interrupted. Such a switch can be located either in the portion of the charging device plugged into the mains, or in or near the portion of the charging device that is plugged into (i.e., mated with) the load or the device to be charged or anywhere between.

In one particular embodiment of the invention, the switch to reconnect the primary circuit is a manual switch that reconnects the charging device to the mains after the charging device circuit has been interrupted, thus effectively disconnecting the charging device from the mains. This manual switch can be any switch that opens the primary circuit between the charging device and the mains. Such switch can be a relay switch, an electronic switch, or an opto coupler switch that may use infrared coupling or any other coupling to open and close a switch in the primary circuit. As used herein, opto coupler includes an opto-isolator, also called an optocoupler, photocoupler, or optical isolator, which is a switch or component that transfers electrical signals between two isolated circuits by using light. The two circuits are the primary and secondary circuits, where the primary circuit typically has a higher input voltage and the secondary circuit a lower stepped down voltage. Thus use of the optocoupler allows a first switch, at a lower voltage in the secondary circuit, to open and close a second switch in the primary circuit.

In a further particular embodiment of the invention, a switch is provided to reconnect the primary circuit of the charging device to the mains after the circuit has been interrupted, which switch uses a power source to reconnect the charging device where that power source is either a battery at the charging device or any residual battery power remaining in the load/device to be charged.

In one particular embodiment of the invention, a charging device has an electrical plug for connecting to the mains at one end and a jack at the other end for connection to a load to be charged and is configured to reduce the voltage from the mains (110 volts or 220 volts AC) to 5 volts DC. Typically, the charging device will charge the load until it is fully charged. However, after charging of the load or if the load is disconnected from the charging device, the primary side of the charging device remains plugged into the mains and thus continues to draw current. This current, though negligible, when multiplied, for example, by all users within a large city, becomes a significant becomes a significant amount of electricity that is wasted.

In one particular embodiment of the invention, the switch is a manual switch which is a part of the charging adapter that reconnects the opened adapter circuit to reconnect the charging device to the mains after the charging adapter circuit has been interrupted. This effectively disconnects and reconnects the charging device from the mains.

Other features which are considered as characteristic for the invention are set forth in the appended claims.

Although the invention is illustrated and described herein as embodied in a current sensing circuit disconnect device and method, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF THE PREFERRED EMBODIMENTS

Figure 2:
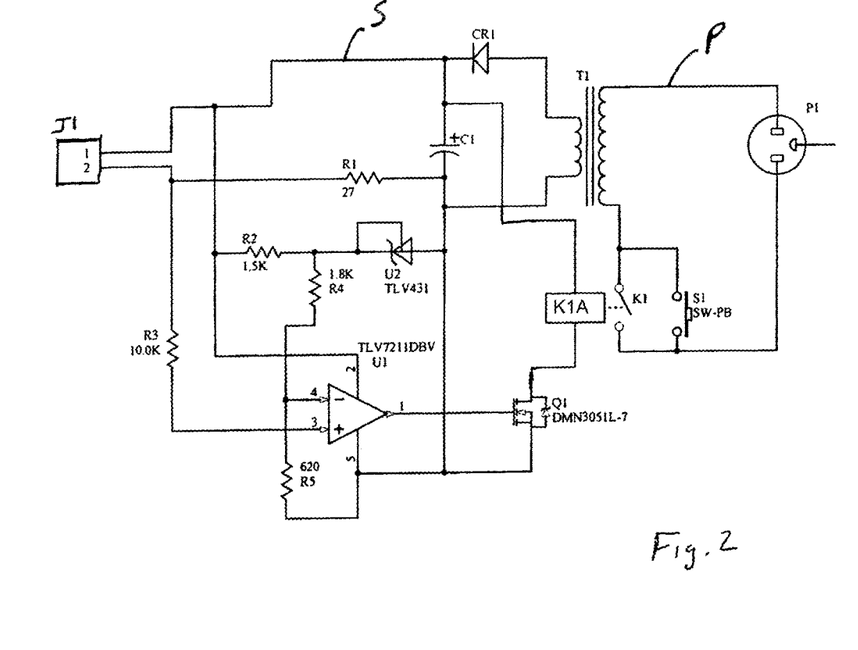
FIG. 2 is a circuit diagram showing an embodiment with a voltage comparator U1 (for box A).

Referring now to FIG. 2, as disclosed in this application is a circuit similar to earlier circuits but more robust. CR1 represents a diode bridge to output direct current. The secondary circuit operates on a stepped down voltage from the input voltage on the primary circuit P, as a result of transformer T1. Transformer T1 can also be a switching transformer where there would be a primary circuit P and a secondary circuit S.

With a load or device to be charged connected to Jack J1 and the primary circuit switch k1 open, a user will need to activate the charging device by pressing switch S1. When current passes through the primary circuit P, a voltage will develop across resistor R1, which is a current sensing resistor of known value. Referring to comparator U1, when the pin 3 voltage is greater than the pin 4 voltage then the output of pin 1 goes high to 8 or 9 volts (in this example, the charger is a 9 volt charger) and this turns low voltage gate, mosfet semiconductor Q1, on and this in turn powers relay K1A and pulls k1 to a closed position and then there is current in the primary circuit without the s1 being in a closed position. The charging device then charges the load (not shown) that has been plugged into Jack J1. When the load is off or unplugged, or no longer charging, at U1, p3 is less than p4, so p1 has zero voltage causing Q1 to turn off and then coil K1 opens to open the primary circuit and no current flows in the primary circuit and no current draw from the mains.

Further in FIG. 2, when the device is plugged into J1, the charger is dead, since the switch s1 or k1 is open and the primary circuit is open. To boot the charger system up, when momentary switch s1 is pressed, current flows in the primary circuit and T1 is energized and power or voltage is supplied to J1 because of current flow in the secondary circuit. In order to boot up, there must be a load attached to J1. R1 is a current sensing resistor of known value and thus a known voltage. R2 and U2 work in combination. R2 controls current flow.

Figure 1:
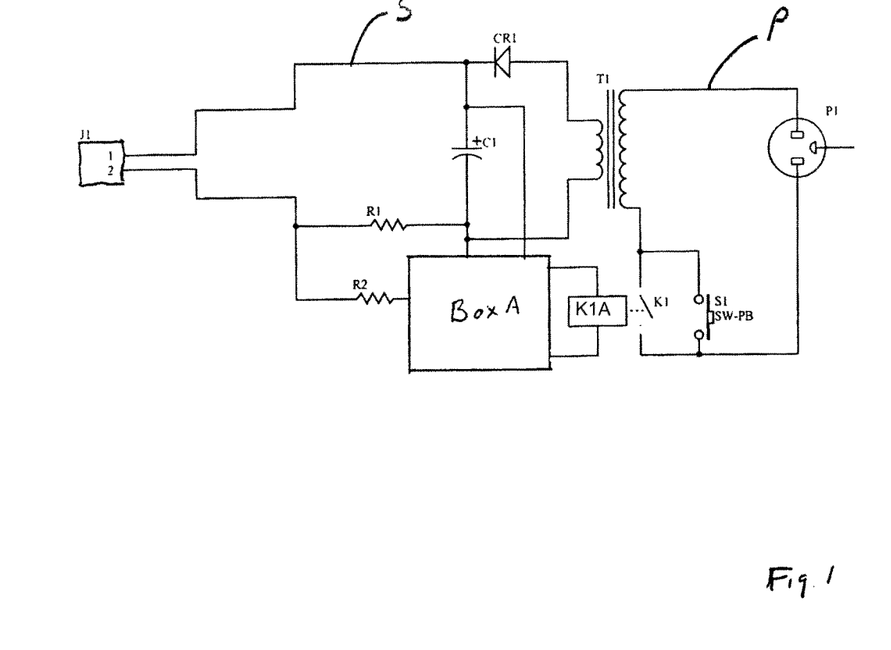
FIG. 1 is a generic circuit diagram showing an embodiment of the present invention, specifically the Box A as a generic switch controller to open and close the switch k1 in primary circuit P as a result of a condition in the secondary circuit S.

Referring to FIG. 1, box A is a generic switch controller which can include many types of electronic devices including an operational amplifier, a voltage comparator device with a transistor or mosfet, a darlington transistor arrangement or a transistor as used in previous circuits. It senses current and switches accordingly.

Figure 3:
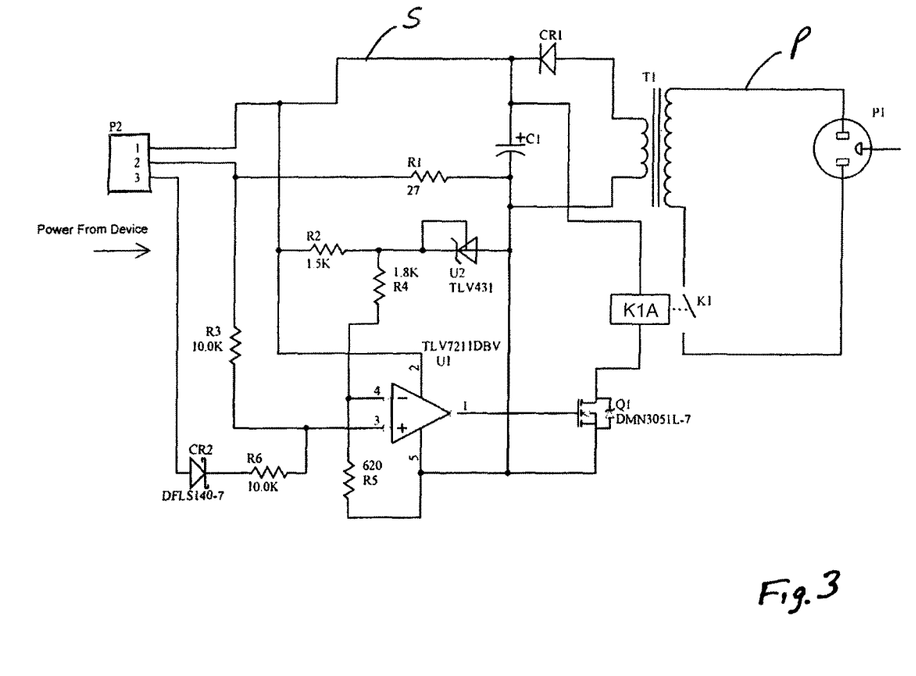
FIG. 3 is a circuit diagram with a pin 3 in jack or plug p2 that takes power from the load/device to turn on k1 initially, by closing the primary circuit, to boot up the charging device.

Referring to FIG. 3, in this circuit, similar to FIG. 2, but the power to boot up the system is obtained from pin 3 of the jack P2. In this circuit, when the primary circuit is in an open position, with switch k1 open, there is no current flow in the primary circuit P. When a device to be charged is plugged into jack P2, a residual voltage can be obtained from the device to be charged that will be sufficient to cause the output pin 1 of comparator U1 to go high and as described in the example for FIG. 2, the output of Q1 will go high and switch K1 will close. Then there is current flow in the primary circuit P and the device is being charged. As described herein, when the device is charged or removed from jack P2, then K1 will open and no current will flow in the primary circuit.

Figure 4:
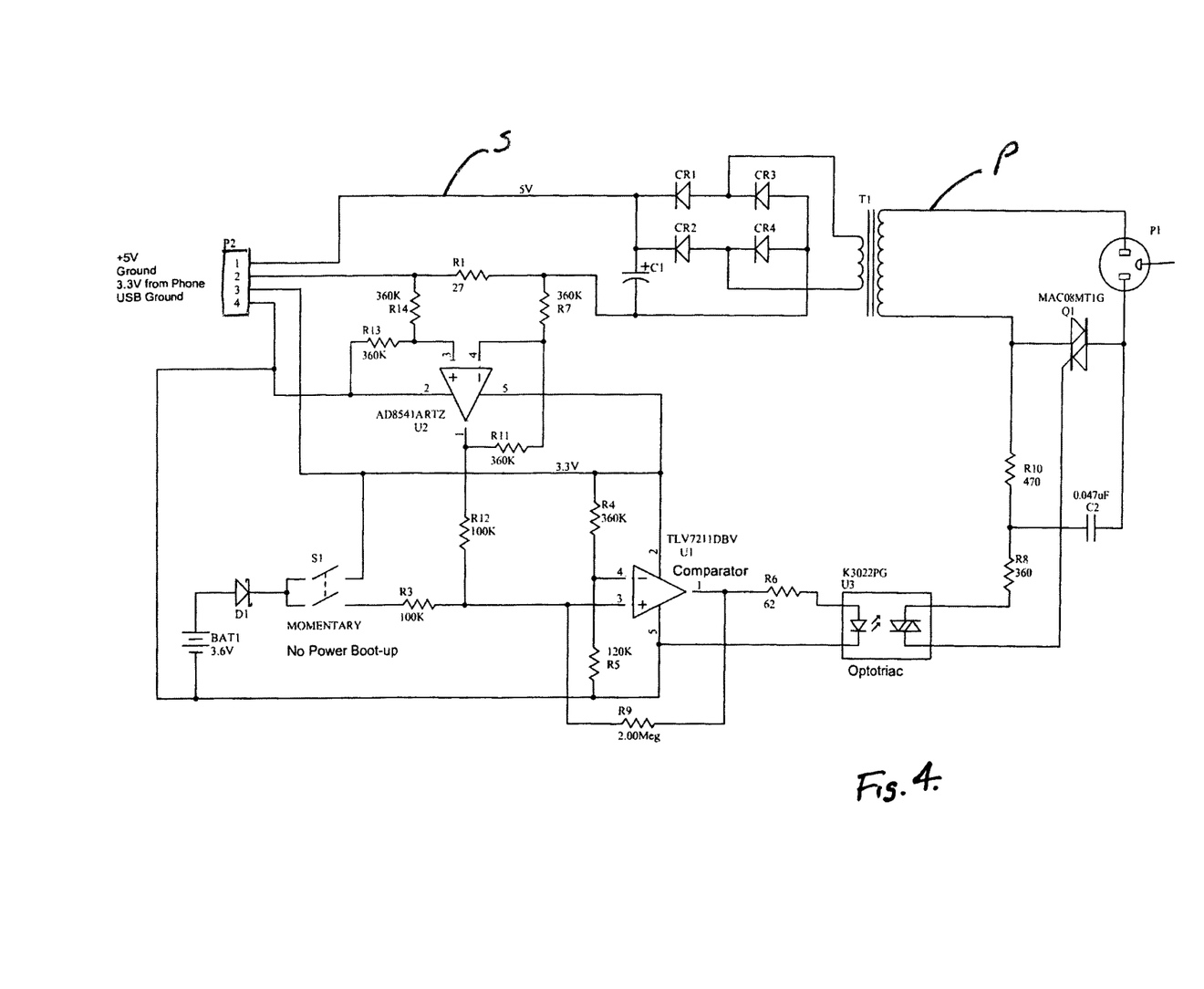
FIG. 4 is a circuit diagram similar to FIG. 3 with battery back-up.

Referring to FIG. 4, is a more robust circuit similar to FIG. 3 that can use the threshold voltage from the device to be charged to boot up the charging device. Further this circuit includes having the boot up switch S1 located in the low voltage secondary circuit S. Locating the switch S1 in the secondary circuit allows the switch S1 to operate at a stepped down lower voltage rather than at the input voltage which likely can be 110 volts AC. A load such as a cell phone, and in particular a smart phone such as the I-phone® and in particular the I-phone 4®, by Apple, Inc. (the words I-Phone and I-Phone 4 are registered trademarks of Apple, Inc. Cupertino, Calif.) have a pin 18 in the connector jack, which delivers or supplies 3.3 volts. This voltage would be enough voltage and even if slightly less voltage to some lower threshold amount of voltage to power the boot up of the charging device of the present invention. Thus in this FIG. 4, the residual voltage from the load that needs to be charged can supply the necessary voltage to boot the charging device and to close the primary circuit, from an open circuit, so that current will flow in the primary circuit and begin charging the device to be charged. In FIG. 4, pin 3 of jack P2 delivers the voltage from the load to boot up the charger system. Based on about 3 volts, when pin 3 voltage is greater than pin 4 voltage, the output at p1 of U1 is high to 3.0 volts and this turns on Optotriac U3. U3 is an optotriac switch that uses an optical switching arrangement, but accomplishes the same switching as previously. So when current flows through R1, U3 is turned on, and the triac relay switch Q1 in the primary circuit is closed so that current flows in the primary circuit P. If R1 current drops (the load is charged and less current flow in the secondary circuit, or the load is unplugged or removed and there is no current in the secondary circuit) then the output of U2 drops. Thus if voltage at pin 3 is less than pin 4 then the output of U1, pin 1 goes low to zero and the Optotriac U3 is turned off the switch Q1 opens to essentially eliminate current flow in the primary circuit P, and the charging device no longer charges the load and essentially no current flows in the primary circuit.

In this circuit FIG. 4, if there is sufficient power in the load or cell phone, then the charging device will use that power to initially boot up the system and close the open switch Q1 in the primary circuit P as described hereinabove. However, in the event the threshold voltage charge in the load at pin 3 of Jack P2 is not sufficient to boot up the charging device system, as in the prior circuits, an internal battery BAT1 is included to provide voltage, a no power boot up voltage from the BAT1, in the system to allow the user to press switch S1 to boot up the charging device system. As previously described, when momentary switch S1 is depressed the output of comparator U1 goes high powering Optotriac U3 and closing switch Q1 to close the primary circuit P and energize the charging device to charge the load or device to be charged that is connected to Jack P2.

It is anticipated that there will be instances when a user will leave a device connected to the charging device after the device to be charged is charged. Over time, the device will lose power in its battery either by normal drain or because the device is in use and consuming power. It is anticipated that the device will need more charging, to recharge the battery to a full charge or toward 100 percent charge. However, when the charging device is in the idle/standby mode of the present invention, the charging device is off and no current flow is in the primary circuit. The device being charged can thus signal the charging device or cause the charging device to boot up so as to repeat the process and recharge the device. E.g. as an example, when the device is fully charged at 100% charge, the device then loses charge to 45%. So as not to lose more charge, the device issues a command to the charging device to recharge the device back up to 100% or a full charge. This signaling or command can be with an application program in the device and in the charger or a boot up signal can be sent from the device being charged to the charger device to boot the charger up e.g. the 3.3 volts at pin 3 can be turned on and then off and then on and that would be similar to re-plugging the device into the load so as to boot-up the charger with the device voltage at pin 3 as described herein. Then as previously described after the device is fully charged, it will be disconnected from the mains.

Figure 5:
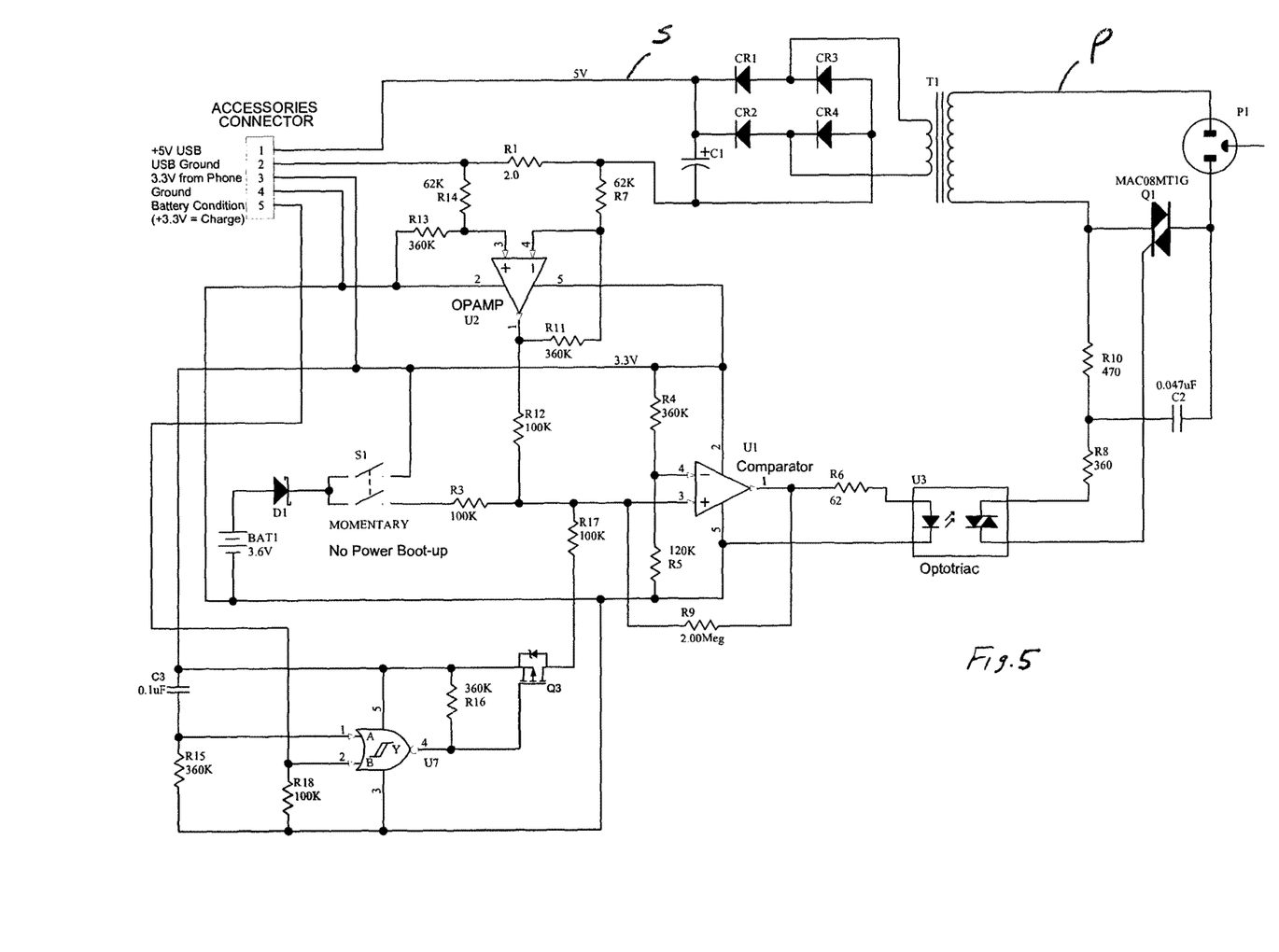
FIG. 5 is a circuit diagram similar to FIG. 4 with a more robust circuit to use residual battery power from the load to initiate the initial boot up of the charging device to close the primary circuit.
Figure 6:
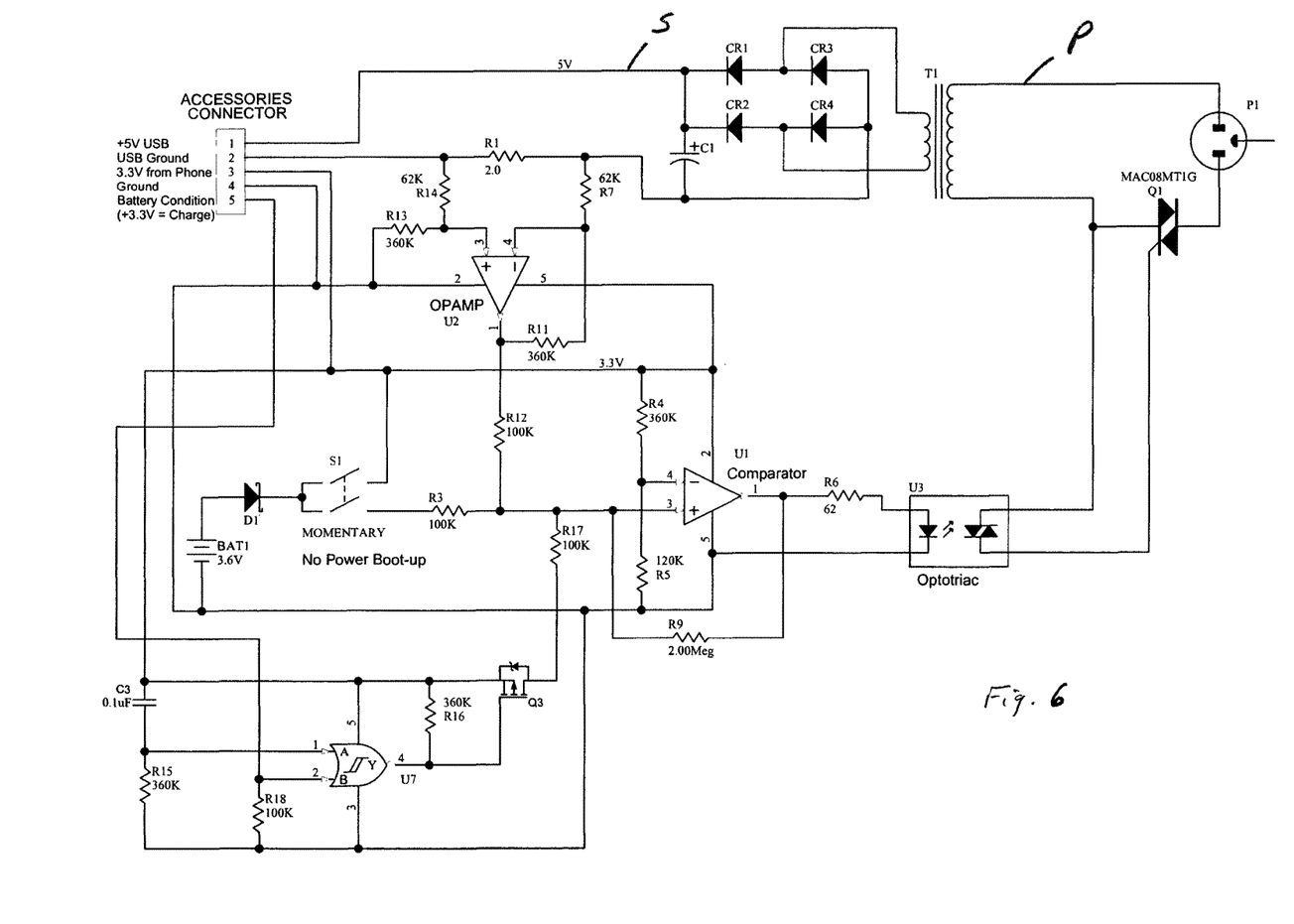
FIG. 6 is a circuit diagram similar to FIG. 5 with a more robust circuit to use residual battery power from the load to initiate the initial boot up of the charging device to close the primary circuit with no current draw in the primary circuit when the primary circuit is open.

As seen in FIGS. 5 and 6, which are substantially similar to the circuit in FIG. 4, the primary circuit includes a plug p1 and a triac relay Q1 that is opened and closed by an Optotriac switch U3. The latter switch U3 is controlled by circuitry in the secondary circuit and thus the higher voltage primary circuit P is separated from the lower voltage secondary circuit S which controls the switching of the primary circuit P on and off or open and closed.

In FIG. 5, as compared to FIG. 6, the combination of capacitor C2 and resistors R8 and R10 eliminate spikes from the primary circuit and the mains that could damage Optotriac U3. However the cost, there is some negligible idle current flow in the primary circuit P when switch Q1 is open. This negligible current is because of the high resistance R10 and low value C2. Reducing C2 to 0.001 micro Farads further lowers any idle current. The elimination of R10 and C2 in alternate circuit FIG. 6 results in no current flow in the primary circuit P when switch Q1 is opened.

In FIGS. 5 and 6, the initial boot up of the charging device is initiated be any of the following:

a). the user, with a device such as a cell phone attached to the accessories connector or jack, of the charging device, (also referred to as Jack P2 in earlier circuits), activates or presses momentary switch S1. This causes the voltage of BAT1 to be applied to comparator U1 and the output of U1 will be high, causing Optotriac U3 to energize and close triac switch Q1 thus callowing current to flow in the primary circuit P. With the input voltage from plug P1 now applied to transformer T1, a stepped down voltage, output voltage, will be applied to the secondary circuit S and direct current to charge the load or device after being rectified in the diode bridge CR1, CR2, CR3 and CR4. When the load or device is charged, there will be a reduction of current in the secondary circuit S and a corresponding voltage drop across R1. The Opamp U2 will go low causing the output of Comparator U1 to go low and Optotriac U3 will go low causing Triac switch Q1 to open in the primary circuit P. In the circuit of FIG. 5, negligible current will flow. However, in the circuit of FIG. 6, no current will be flowing in the primary circuit P and the charging device will pull no current or power from the mains.

b). when a user plugs the accessories connector (Jack) of the charging device into the device to be charged, and the primary circuit P is open (in either FIG. 5 or 6), power is needed to boot up the charging device in order to close the switch Q1 in the primary circuit P. In part a) above this power came from an onboard battery BAT1 in combination with the user pressing momentary switch S1. However in this alternative initial boot up system, the needed power can be obtained from the device to be charged, at least in most or many situations. Assuming a cell phone is the desired load or device to be charged, typically for many users, their cell phone is recharged while the cell phone is still operational, which means there is a charge, or power, remaining in the battery of the cell phone. This remaining battery power can be used to automatically boot up the charging device of the present invention without the interaction of the user having to press a button to boot up the charging device. As seen in FIGS. 5 and 6, as well as in FIG. 4, approximately 3.3 volts can be obtained from the device to be charged, e.g. the phone battery. This voltage from the phone battery is applied to an electronic momentary switch formed by the combination of the logic norgate U7 and mosfet Q3. As described above, the output of mosfet Q3 is high and causes comparator U1 to go high, energizing Optotriac U3 and closing Triac switch Q1 to close the primary circuit P and thus with current flow in the primary circuit, the charging device is booted up and the process heretofore is repeated, charging the load. This automatic boot is possible because of the use of the remaining power from the load.

The load may have a half charge or some portion of a charge such that the load or phone is operating. It is also possible that though the load may not work, e.g. the cell phone will not operate. However even in this condition, it is likely the cell phone has a threshold operating voltage e.g. 3.5 volts and though the cell phone will not operate, the cell phone battery can have a remaining charge e.g. 3.3 volts or less. This remaining charge in the cell phone battery will be sufficient to initiate the initial boot up of the charging device in the present circuit. This automatic initial boot up now allows a user to charge the device e.g. cell phone, without having to press any buttons to boot up the charging device. This is very similar, and the same, as a user is presently accustomed, using a charging device to charge a cell phone, by merely attaching the charging device to the device to be charged. Of course, this is presently possible, because the primary circuit P in a typical charging device is always connected to the mains, with the disadvantage of drawing power all the time. The present invention now provides the same convenience to a user, by automatically booting up the charging device, by using the power from the device to be charged to boot up the charging device and close the primary circuit from its open position.

c). since it is possible in the circumstances described in part b) above, that a device to be charged will have such a small amount of power left in the power supply of the device to be charged, e.g. the battery of the device to be charged, that there will not be sufficient battery power to initiate boot up of the charging device. Therefore, the present invention provides a backup, namely the option to use the momentary switch S1 to boot up the charging device as described in part a) above. It must be noted that use of the momentary switch S1 is on the secondary side of the transformer and thus there is low voltage at the switch S1. This differs from some manual switches used in the prior art that are connected to the primary side P where the input voltage is very high e.g. 110 volts. Where in the present invention, the voltage at the switch S1 is very low at about 3 to 5 volts or less.

d) Often times a user of a device to be charged will leave the device e.g. cell phone or tablet device, connected to the charging device for long periods of time and while connected the device to be charged is in use. Under these circumstances the battery of the device to be charged, which is in use, will continually use its internal power, since the charging device of the present invention after charging no longer charges the load since the primary circuit has no current flow. In the heretofore described circuits, once a device is charged and the charging current in the secondary is reduced the primary circuit is opened to eliminate current flow and power usage in the primary circuit. In this situation, an App Program can be resident in the device to be charged such as a smart phone or tablet. The App Program can monitor the battery condition or remaining power left in the battery of the device to be charged, e.g. the cell phone.

The user can set a desired voltage in the App Program e.g. when the battery is fully charged the battery will be at 100%, so when the battery reaches for example 65% charge, the App Program can apply a voltage to the charging device to cause the charging device to boot up again and resume charging the battery of the load back to a full charge e.g. 100%. When charged the charging device will open the primary circuit and the cycle will start over again as many times as necessary to continually maintain the charge of the connected device which is in use from e.g. 100% down to 65% and then back up during the charging cycle to a full charge or 100% charge.

Figure 7:
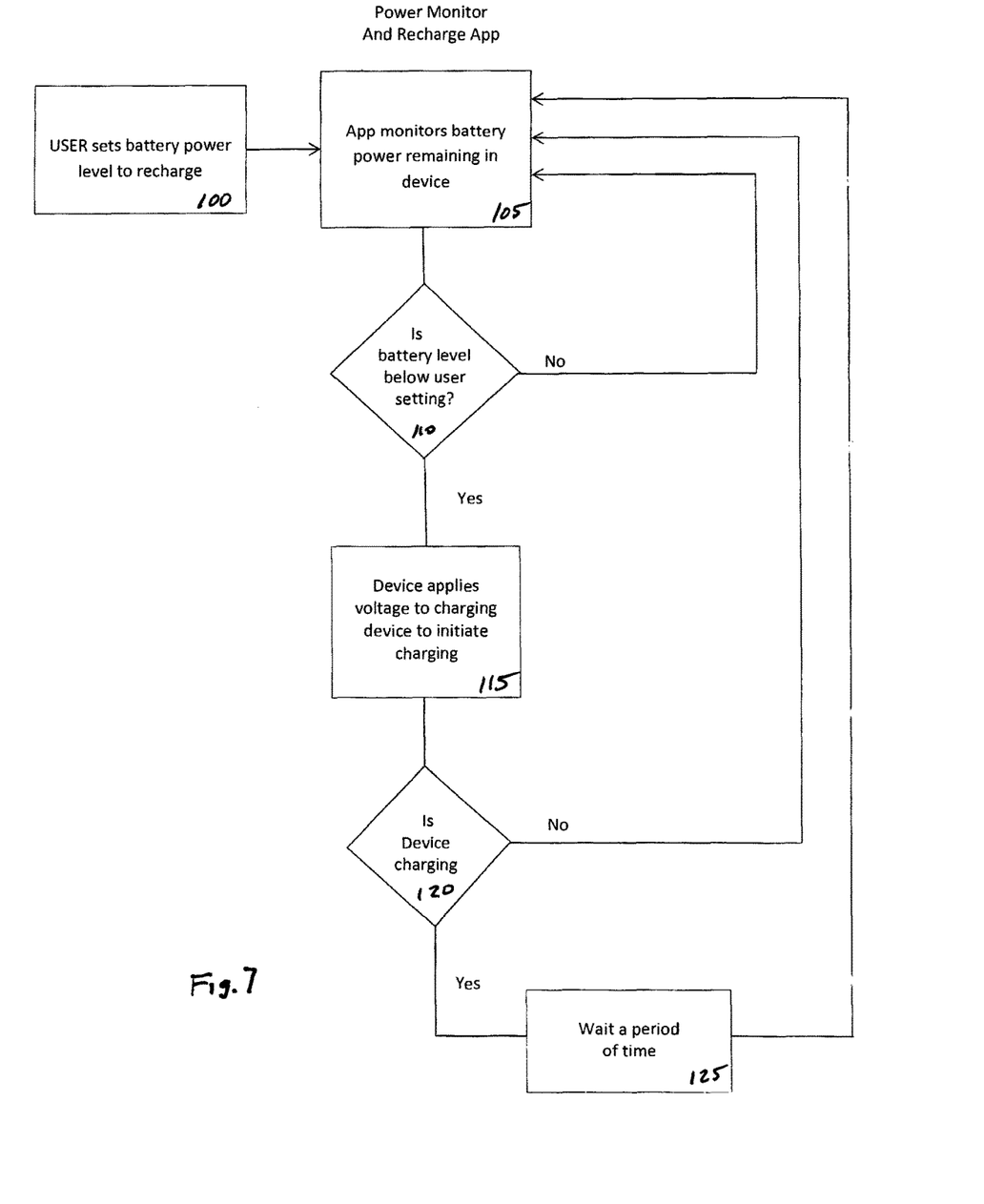
FIG. 7 is a flow chart for an Application Program resident in the load or device to be charged that will cause the charging device to boot up and continue charging when the charged device remains connected to the charging device and the battery level in the charged device reaches a certain threshold level determined by the user, such that as the battery level of the charged device decreases, the charging device will continually charge the battery towards a full charge.

The App Program is shown by flow chart in FIG. 7. Thus, the present invention further includes an application program (App Program) to run on the device to be charged such as a mobile device, such as a smart cell phone, or any other device being charged by the charging device of the present invention. This App Program will complement or work in conjunction with the charging device to cause the charging device to reconnect to the device being charged after the charged device has been fully charged but has lost a predetermined portion of its charge. This may happen if the device is being charged while being used for either talking, some desired communication or other device activity that causes the device battery, once charged, to discharge over time.

When the App Program is initiated, the user will input, see box 100 at FIG. 7, the desired level of battery charge or percent of charge remaining that is desired in order to cause the device to be reconnected to the charging device and be recharged. As an example, a user may desire to have the battery charged when it falls below 65% of a full charge. However, this number is adjustable. The App Program monitors the battery level remaining in the device to be charged, see box 105. The App Program then determines if the battery level is below the user set battery level, box 110. If the lower charge level has not been reached, the App continues to monitor the battery level. If the charge level has been reached, then the device applies a voltage to the charging device to initiate charging, box 115. This voltage is applied through the accessory connector between the device being charged and the charging device jack as shown in FIGS. 4, 5 and 6. As seen in FIGS. 5 and 6, the voltage is applied to the electronic momentary switch described above. Once the charging device is booted up, the applied voltage from the phone or device is no longer used, which is controlled by norgate U7.

After the device applies the voltage in box 115, the App Program verifies the device is charging, see box 120. If the device is not charging the App Program continues to monitor the battery power, and the device will apply a voltage again in box 115. If the device is charging, then a time delay in box 125 will allow the device a time to charge, which can be adjustable, and then the cycle will begin again. During the charge cycle the App Program will continually monitor the charge of the device battery. When the device is fully charged, the charging device will, as previously described, open the primary circuit so as not to use power in the idle and standby modes. The App Program will continue to monitor the battery power in box 105 to repeat the cycle of charging the device while it is left plugged into the charging device and the device is using battery power.

Figure 8:
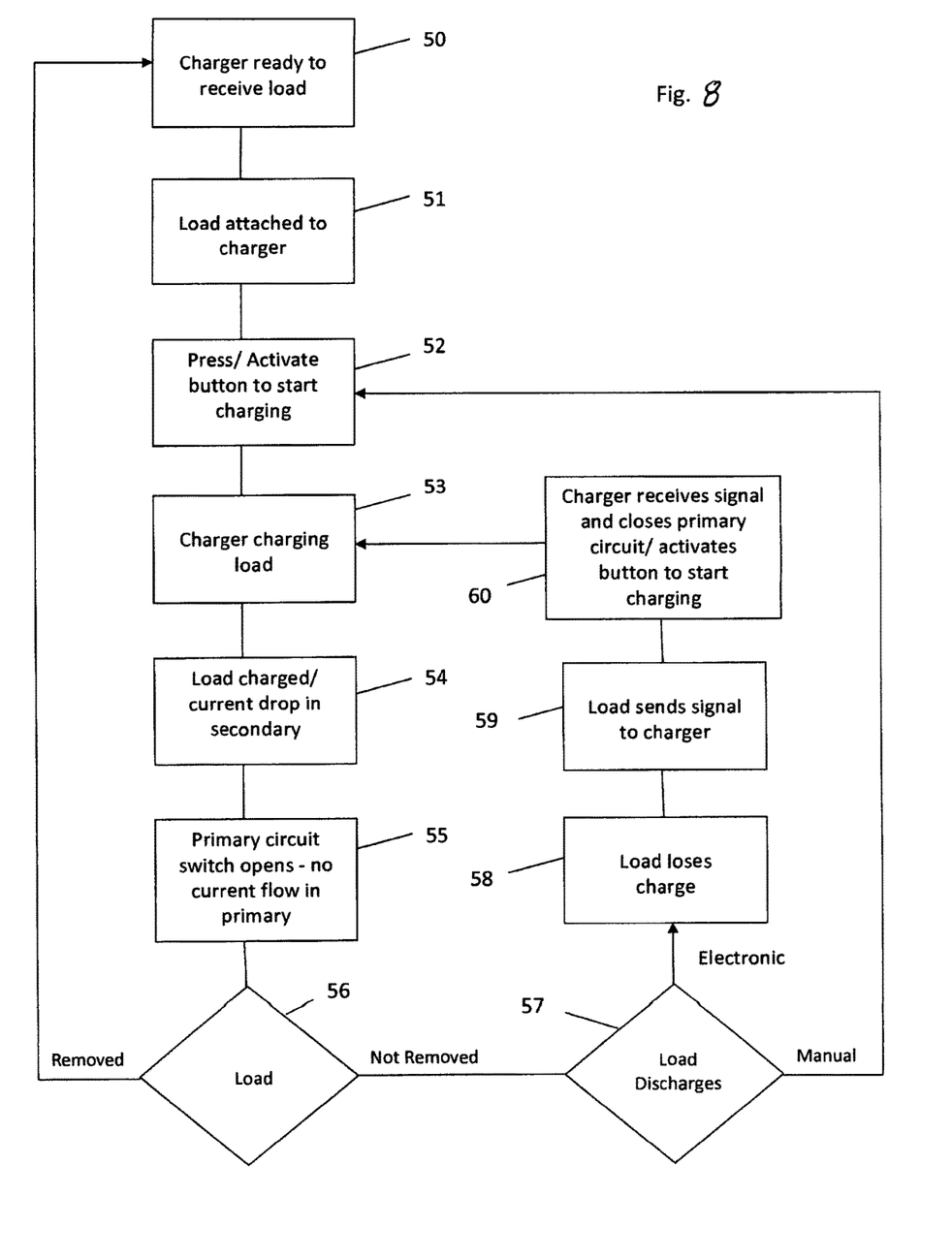
FIG. 8 is a flow chart showing the steps to connect a load and reconnect the load after the load is disconnected.

FIG. 8 is a flow chart showing certain steps of the present invention, where at block 50 the charging device is ready to receive a load. The load is attached to the charger at block 51. With the load attached to the charger, the activate button or switch at block 52 is activated causing the switch in the primary circuit to close, whether or not this switch in the primary circuit was previously closed. At block 53 the charger charges the load using power through the primary circuit and through the secondary circuit. At block 54, when the load is charged or the load is removed, there will be a current drop or change in the secondary circuit. At block 55, when the load is charged or if the load is removed, there is a change in the current flow in the secondary circuit, when this is detected, the primary side circuit switch will open and no more current will flow in the primary side circuit as the charger will be effectively disconnected from the mains. At block 56, if the load is removed or disconnected, the charger will then be ready to receive the load again at block 50. Alternatively if the load is not disconnected from the charging device, the load will discharge over time and at block 57 when the load discharges it can be recharged by manual activation with the activation button to start charging by returning to block 52 and the activation button will be activated to start charging. Alternatively at block 57 additional circuits can be provided such that when the load loses charge either the load can monitor the need for recharging or the charging device can measure the amount of charge left in the load at block 58. From the heretofore App Program, the load sends a signal to the charger that it needs charging at block 59, then the charger will close the open switch in the primary circuit or activate the button to start charging at block 60 and the charger will again begin charging the load at block 53. Alternatively at block 60, the charging device can measure the power in the load and close the switch in the primary circuit to begin charging again. The variables for determining the power remaining in the load and when to begin recharging can be determined according to a load manufacturer's specifications and set accordingly in the algorithm at blocks 58 to 60 and may be in conjunction with the App Program.

The above-described embodiments are exemplary and that the above invention is not meant to be limited only to its preferred embodiments. It can be seen that other modifications can be made to the preferred embodiments and still be within the spirit of the present invention.

We claim:

1. A charging device, comprising:
    a primary-side circuit and a secondary-side circuit;
    the primary-side circuit including a first switch having an open state that opens said primary-side circuit to current flow and a closed state that permits current flow through said primary-side circuit;
    the secondary-side circuit including a connector for connection to a load for charging an energy storage device in said load;
    a second switch in said secondary-side circuit for switching the first switch from an open state to a closed state; and
    said first switch remaining in the open state when no load is connected to said connector of the secondary-side circuit, said second switch being closed from an open state using a residual battery power stored in the load when the load is connected to said connector.

2. The charging device of claim 1, wherein the first switch is part of a relay or other electromechanical switch.

3. The charging device of claim 1, wherein the first switch is a relay contact in the primary-side circuit closed by a relay coil in the secondary-side circuit that is energized when a solid state switching device is turned-on.

4. The charging device of claim 1, wherein said secondary-side circuit includes a battery that provides power to initiate closing of the first switch when the second switch is closed.

5. A method for disconnecting a charging device including a primary side circuit and a secondary side circuit, with a load connectable to the secondary side circuit, the method comprising the steps of:
    providing a first switch in the primary-side circuit having an open state that opens said primary-side circuit to current flow and a second switch in the secondary-side circuit, said second switch switching the first switch from an open state to a closed state when said second switch is actuated;
    opening the first switch when a sensing device determines a decrease of current flow in the secondary-side circuit, the first switch remaining in the open state when no load is connected to the secondary-side circuit; and
    actuating the second switch using a residual battery power stored in the load when the load is connected.

6. The method of claim 5, wherein the first switch is part of a relay or other electromechanical switch.

7. The method of claim 5, wherein said secondary-side circuit includes a battery that provides power to initiate closing of the first switch when the second switch in the actuating step is closed.

8. The method of claim 5, wherein said secondary-side circuit uses power from the load to initiate closing of the first switch when the second switch in the actuating step is closed.

9. The charging device of claim 1, wherein said second switch is activated by a program executed on the load.

10. The charging device of claim 2, wherein said first switch includes an optocoupler.

11. The method of claim 6, wherein the first switch includes an optocoupler.

12. The method of claim 9, wherein said second switch is actuated in response to a signal from an external program executed on the load.

13. A method for disconnecting a charging device including a primary side circuit and a secondary side circuit, with a load connected to the secondary side circuit, the method comprising the steps of:
- providing a first switch in the primary-side circuit having an open state that opens said primary-side circuit to current flow;
- opening the first switch in response to a signal from the secondary-side circuit indicating that the load is charged;
- closing the first switch in response to a signal from a program resident in the load and executed by a processor internal to the load using a control circuit in the secondary-side circuit; and
- said first switch remaining in the open state when no load is connected to the secondary-side circuit.

14. The charging device of claim 13, wherein said first switch includes an optocoupler.

\* \* \* \* \*

UNITED STATES PATENT AND TRADEMARK OFFICE
CERTIFICATE OF CORRECTION

PATENT NO. : 10,050,459 B2  
APPLICATION NO. : 14/329787  
DATED : August 14, 2018  
INVENTOR(S) : Robert M. Schwartz et al.

Page 1 of 1

It is certified that error appears in the above-identified patent and that said Letters Patent is hereby corrected as shown below:

On page 2, "Related U.S. Application Data", Line 2, the text beginning with "continution of" should read -continuation-in-part- Signed and Sealed this  
Sixth Day of November, 2018

Andrei Iancu  
*Director of the United States Patent and Trademark Office*